Patented Feb. 23, 1943

2,311,970

UNITED STATES PATENT OFFICE 2,311,970

REFRACTORY

Gilbert E. Seil, Cynwyd, Pa., assignor to E. J. Lavino and Company, Philadelphia, Pa., a corporation of Delaware No Drawing. Application July 23, 1941, Serial No. 403,660

10 Claims. (Cl. 106—59)

This invention relates to refractory materials and their method of manufacture and has for its object the provision of a refractory material of novel composition and characteristics prepared by the decomposition of a natural spinel and the formation of one or more artificial spinels by a heat induced reaction involving the decomposition products of the starting spinel, said artificially formed spinels being different in chemical composition from the starting spinel.

One embodiment of the invention contemplates the heat treatment of crude chrome ore in the presence of magnesium oxide to cause chemical rearrangements by which the original chromite spinel of the ore is decomposed and reformed into a chromite spinel of different chemical composition, a portion of the base of the original chromite spinel is converted into an acidic body which acidic body in turn is converted into a spinel by further reaction with magnesium oxide. The silica of the crude ore is meanwhile converted into magnesium orthosilicate.

For the purposes of this description it is sufficiently accurate to say that natural chrome ore comprises a chromite spinel of the general formula $(FeO.MgO)(Cr_2O_3.Al_2O_3)$ associated with magnesium silicate gangue minerals which can be considered as having the general formula $MgO.SiO_2$, although actually this formula varies from $2MgO.3SiO_2$ to $3MgO.SiO_2$. There are chrome ores in which the associated gangue mineral is quartz, but ores in which this condition occurs are unusual, and the occurrence of the associated silica as magnesium metasilicate or as quartz does not change the method of carrying out this invention.

The naturally occurring chromite spinel of chrome ore is a ferrous chromite in which a portion of the FeO of the base has been replaced by MgO, and a portion of the $Cr_2O_3$ of the acid radical has been replaced by $Al_2O_3$. The replacement of $Cr_2O_3$ by $Al_2O_3$ in the acid radical up to the point at which there are equal weights of $Cr_2O_3$ and $Al_2O_3$ in the acid radical does not affect the usefulness of the chromite for refractory purposes, and in the natural chromites with which I am familiar, the replacement of $Cr_2O_3$ by $Al_2O_3$ does not exceed this proportion. On the other hand, the extent to which the FeO has been replaced by MgO is an important consideration because the chemical reactivity of the chromite increases with the amount of FeO in the base. Thus chrome ores containing more than 14% of iron as FeO are generally considered to be too reactive chemically for refractory purposes, while the chrome ores selected for chemical purposes, in which chemical reactivity is a very desirable quality, contain on the order of 25% of iron as FeO.

Substantially all the iron in natural chrome ores occurs as ferrous iron (FeO) in the chromite. Small amounts of ferric iron ($Fe_2O_3$) are sometimes found in the gangue minerals, but when found, the amounts are small and negligible. Chromites containing under 14% FeO, such as are used in the refractories field, are generally considered to have very low chemical activities. Yet I have found that fine grinding and exposure to air at ordinary atmospheric temperatures result in the oxidation of a considerable proportion of the ferrous iron in the chromite. Starting with a chromite containing 13% to 14% FeO, it is not unusual to find only 6% FeO in the ore after fine grinding, and often oxidation of the iron takes place to such an extent that as little as 2% unconverted FeO remains in the finely divided chromite. Natural chrome ores are, therefore, partially oxidized by decomposition of the chromite spinel and conversion of the iron to the ferric state by fine grinding at ordinary atmospheric temperatures.

If a natural chrome ore is heated above 2372° F. (the dissociation temperature of $Fe_2O_3$), as it would be in the firing of a chrome ore brick, all the iron in the chromite is present as FeO while the temperature is maintained. If a chrome ore brick is rapidly cooled from temperatures above 2372° F., most of the iron will remain in the ferrous state, and in a properly bonded chrome brick only the surface will be reacted upon by oxygen or $CO_2$ to decompose the spinel and yield ferric oxide. On slower cooling oxidation takes place even to the center of the brick, and I have examined chrome ore brick in which the FeO in the faces exposed to the furnace atmosphere was of the magnitude of 0.5% to 1.00%, while the FeO in the center of the brick was of the magnitude of 1% to 4.5%. The presence of free alkaline earth oxides in the brick mixture increases the rate of oxidation at a given temperature and decreases the initial temperature at which oxidation takes place.

It is the ferrous iron in the chromite which causes the decomposition of the spinel and which causes the chemical reactivity of the chromite. The elimination of the iron from the chromite spinel in refractory bodies, and the formation of an innocuous iron compound dispersed in the matrix of the refractory body will, therefore, greatly increase the resistance of the chromite and of the body to attack by furnace slags and gases, and will result in a refractory of decidedly superior characteristics.

One object of this invention therefore is the provision of a chromite refractory material from natural chrome ore in which the chromite spinel contains substantially no iron, the iron of the original spinel being present in the final refractory product as the spinel $MgO.Fe_2O_3$ and the silica of the original ore being present in the final refractory product as magnesium orthosilicate $2MgO.SiO_2$. The object is accomplished by heat treating the original ore in an oxidizing atmosphere in the presence of a magnesium oxide yielding material so as to cause to take place the reactions represented by the following equation:

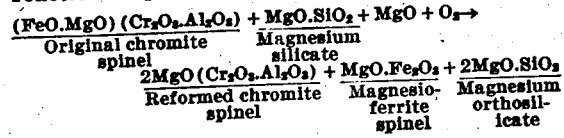

The above equation is only for the purpose of illustration, and shows the starting materials and the end products of the reaction. I have not attempted to balance the equation with respect to the molecular equivalents of the reacting substances or the products obtained because the reaction most likely goes through a series of intermediate steps, and the sequence of the steps has no bearing on the final products. Thus it is likely that the original chromite spinel is first decomposed, with MgO replacing FeO in the base. The FeO thus liberated is oxidized to $Fe_2O_3$ and reacts with additional MgO to form the spinel magnesio-ferrite. The magnesium metasilicate $MgO.SiO_2$ reacts with magnesia to form magnesium orthosilicate $2MgO.SiO_2$.

The end product is a refractory material comprising grains of the reformed chromite spinel surrounded by magnesium orthosilicate in which the magnesio-ferrite spinel is disposed. The small amount of CaO present in the normal natural chrome ore forms calcium magnesium orthosilicate (monticellite—

$$CaO.MgO.SiO_2)$$

which is also dispersed in the magnesium orthosilicate surrounding the grains of the reformed chromite spinel. The preferred end product is a chrome-base refractory brick in which grains of the reformed, substantially iron-free, chromite spinel are imbedded in and bonded by a matrix which is principally magnesium orthosilicate, with magnesio-ferrite and monticellite dispersed throughout the matrix.

The amount of magnesium oxide required for the reaction is calculated from the analysis of the starting chrome ore. In the calculations which follow the molecular percentage is obtained by dividing the molecular weight into the percentage, and the following molecular weights are used:

| | |
|---|---|
| $Cr_2O_3$ | 152 |
| $SiO_2$ | 60 |
| FeO | 72 |
| $Al_2O_3$ | 102 |
| MgO | 40 |
| CaO | 56 |

Consider for example a typical refractory grade chrome ore of the following analysis:

| | Percentage by weight | Molecular percentage |
|---|---|---|
| $Cr_2O_3$ | 32.64 | 0.215 |
| $SiO_2$ | 4.79 | 0.079 |
| FeO | 13.22 | 0.184 |
| $Al_2O_3$ | 29.60 | 0.290 |
| CaO | 0.80 | 0.014 |
| MgO | 17.45 | 0.436 |

The molecular sum of the acids $(Cr_2O_3+Al_2O_3)$, in the original chromite spinel is 0.505, and therefore the molecular sum of the bases (FeO+MgO) is 0.505, of which 0.184 is accounted for by the FeO contained in the spinel. The molecular percentage of the MgO in the spinel is therefore 0.505 minus 0.184 or 0.321, and the molecular percentage of the MgO combined with the $SiO_2$ as a serpentine mineral is 0.436 minus 0.321 or 0.115. Since the molecular percentage of $SiO_2$ is 0.079, the gangue mineral in the ore used as an example is (disregarding water of hydration of course) $3MgO.2SiO_2$.

In the practice of this invention using the above ore as a starting material, sufficient MgO is added to permit the following rearrangements to take place:

The FeO in the chromite is replaced by MgO, because the acid radical of the chromite has a greater affinity for MgO than for the FeO which originally formed part of the base of the chromite. The FeO thus liberated is oxidized to $Fe_2O_3$. At the temperature of treatment the $Fe_2O_3$ combines with MgO to form the spinel $MgO.Fe_2O_3$. The silica or lower silicates of magnesia form magnesium orthosilicate at the temperature of treatment if the available MgO is molecularly twice or more than twice the silica present. The reaction, therefore, comprises four steps:

1. The FeO in the chromite is replaced by MgO.
2. The FeO thus liberated is converted to $Fe_2O_3$.
3. The $Fe_2O_3$ reacts with MgO to form $MgO.Fe_2O_3$.
4. The silica or silicates of the gangue react with MgO to form $2MgO.SiO_2$.

Practically, the MgO requirements are as follows:

For each pound of FeO replaced in the chromite: $40/72$ or 0.556 pound, or $(13.22 \times 0.556)$ 7.48 pounds for 100 pounds of starting ore.

For each pound of FeO converted to $$MgO.Fe_2O_3$$

each pound of FeO is first converted into $160/(2 \times 72)$ or 1.11 pounds of $Fe_2O_3$. In 100 pounds of starting ore then $1.11 \times 13.22$ or 14.67 pounds of $Fe_2O_3$ are obtained as an intermediate reaction product. Each 160 pounds of $Fe_2O_3$ requires 40 pounds of MgO for conversion to $MgO.Fe_2O_3$, and 100 pounds of the starting ore require $14.67 \times 40/160$ or 3.67 pounds of MgO to form the magnesio-ferrite spinel.

For each pound of $3MgO.2SiO_2$ to be converted to $2MgO.SiO_2$: each 120 pounds $(2 \times 60)$ of silica in the starting ore require 40 of MgO, and 100 pounds of the starting ore require $4.79 \times 40/120$ or 1.59 pounds of MgO for the conversion to magnesium orthosilicate.

The total MgO requirements therefore of 100 pounds of the starting ore used are:

| | Pounds |
|---|---|
| For the conversion to $2MgO (Cr_2O_3.Al_2O_3)$ | 7.48 |
| For the conversion to $MgO.Fe_2O_3$ | 3.67 |
| For the conversion to $2MgO.SiO_2$ | 1.59 |
| Total | 12.74 |

The MgO requirement will vary of course with the type of ore and the type of gangue, and will be increased as the percentage of total iron in the ore increases, and will be increased as the requirements of the silica or silicate of the gangue minerals increase, as for instance $SiO_2$ in quartz gangue requires 80 pounds of MgO for each 60 pounds of $SiO_2$ in the ore, and magnesium metasilicate $MgO.SiO_2$ requires 40 pounds of MgO for each sixty pounds of $SiO_2$ as determined by the chemical analysis of the ore.

If a mixture of natural chrome ore and the calculated amount of magnesium oxide (plus a slight excess of magnesium oxide to compensate for the imperfection of mechanical mixing) is heated to a temperature above 3100 F., the reactions previously described take place. The exact time and temperature requirements vary with the type of ore, and in some cases it may be necessary to heat the mass to fusion. I have found that in most chrome ores of refractory grade a mixture composed of 77.5 parts of chrome ore and 22.5 parts of magnesium oxide, heated to temperatures of the magnitude of 325° F., will yield the product described herein. The product will comprise grains of an artificial spinel of the formula $2MgO(Cr_2O_3.Al_2O_3)$, surrounded and bonded by a ground mass or matrix of magnesium orthosilicate $(2MgO.SiO_2)$, with magnesio-ferrite $(MgO.Fe_2O_3)$, small amounts of periclase $(MgO)$ and small amounts of monticellite $(CaO.MgO.SiO_2)$ dispersed in the ground mass.

Several methods of following the basic principles of the invention are possible. In one method the chrome ore and the required amount of magnesia yielding material, such as magnesite, are intimately mixed and fired at a temperature in excess of 3100° F. until the conversion is complete. The firing may be carried out in any suitable equipment, such as a rotary kiln. Very satisfactory firing is accomplished by pressing the mixture into adobes and firing them in a tunnel kiln. Fine grinding of the chrome ore is not necessary; chrome ore ground to pass a 6 mesh Bureau of Standards screen will yield the desired product. The magnesite, however, should be finely divided, and should be ground so that at least 85% passes a 200 mesh Bureau of Standards screen. The fired material is crushed so as to prepare any desired mesh ratio and used as an intermediate for the manufacture of brick or other refractory products. Finished refractory products, brick for example, may then be manufactured by using 55% to 75% of the intermediate product crushed so that it all passes a 6 mesh Bureau of Standards screen with substantially all retained on a 40 mesh screen and 45% to 25% of finely ground intermediate product, tempering the mixture, pressing it into shapes, drying and firing the shapes at temperatures in excess of 3100° F. Chemical bonds of, for example, the oxy-sulphate type may be used when pressing the brick, and the brick may then be shipped in the unfired state.

In another method of practicing the invention, the crude chrome ore is fired at temperatures in excess of 3100° F., and preferably in excess of 3250° F., to recrystallize the chromite of the ore and to distribute the gangue minerals as a thin glass over and around the grains of recrystallized chromite. The chrome ore thus treated is ground preferably so that it all passes a 6 mesh Bureau of Standards screen and is substantially all retained on a 40 mesh Bureau of Standards screen. To this treated chrome ore grog is added the required amount of finely divided magnesia yielding material. The materials are dry mixed, tempered, pressed into brick, dried and fired at a temperature above 3100° F. until the conversion is complete.

The product of the invention is a brick having unusually high hot load strength, good spalling characteristics, but most important, it has the chemical stability to resist change in composition when in contact with furnace gases and furnace slags at extremely high operating temperatures. The last characteristic is extremely important in open hearth and electric furnaces producing high alloy steels, where operating temperatures higher than normal are encountered and where exposure to highly reactive slags and gases are normal operating conditions.

Having thus described and exemplified my invention, which is in no wise limited to the examples given, I claim:

1. A refractory body comprising an iron free chromite spinel in a ground mass of magnesium orthosilicate, with magnesio-ferrite, periclase and monticellite dispersed in the ground mass.

2. A refractory brick that contains refractory material according to claim 1.

3. A chromite refractory granular material made from natural chrome ore, characterized in that the chromite spinel of the refractory has the formula $2MgO(Cr_2O_3.Al_2O_3)$ and contains substantially no iron, iron of the original spinel being present in the refractory as magnesio-ferrite spinel $(MgO.Fe_2O_3)$ and silica of the original ore being present in the refractory as magnesium orthosilicate $(2MgO.SiO_2)$.

4. The process of manufacturing a refractory body from natural chrome ore which comprises the heat treatment in an oxidizing atmosphere of a mixture of the natural chrome with a calculated quantity of a magnesium oxide yielding material at a temperature in excess of 3100° F. to cause chemical rearrangements by which the original chromite spinel of the ore is not only decomposed but reformed into a chromite spinel of different chemical composition whereby a portion of the base of the original chromite spinel is converted into an acidic body which acidic body in turn is converted into a spinel by further reaction with magnesium oxide, and the silica of the natural ore is converted into magnesium orthosilicate.

5. The process of making a refractory body which comprises mixing together starting materials of natural chrome ore and a material that yields magnesium oxide $(MgO)$, the latter being added in such calculated amount that after combining with the chromite and iron there is available at least twice as much MgO molecularly as there is silica $(SiO_2)$, heating the mixture in an oxidizing atmosphere to a temperature in excess of 3100° F. for a time long enough to (1) replace the FeO of the chromite with MgO, (2) convert the thus liberated FeO to $Fe_2O_3$, (3) react the $Fe_2O_3$ with MgO to form $MgO.Fe_2O_3$, and (4) react the silica or silicates of the gangue of the ore with MgO to form $2MgO.SiO_2$.

6. The process of making a refractory body which comprises mixing together starting materials of natural chrome ore of the order to 77.5 parts and magnesium oxide of the order of 22.5 parts, and heating the mixture in an oxidizing atmosphere to a temperature of at least 3100° F. and preferably of the order of 3250° F. for a time long enough to cause reaction between the reactable constituents of the mixture to form a chemically stabilized mass.

7. The process of making a refractory body which comprises mixing together starting materials of natural chrome ore and a material that yields MgO in a proportion of at least substantially 16 pounds of MgO for each 100 pounds of ore, and heating the mixture in an oxidizing atmosphere to a temperature of at least 3100° F. for a time long enough to cause reaction between the reactable constituents of the mixture to form a chemically stabilized granular mass.

8. The process of making a refractory body which comprises mixing together starting materials of natural chrome ore sized to pass through a 6 mesh screen and magnesite sized so that at least 85% thereof will pass through a 200 mesh screen, the starting materials being proportioned so that the MgO available after combining with the chromite and iron is molecularly at least twice the $SiO_2$ present, and heating the mixture in an oxidizing atmosphere to a temperature of at least 3100° F. for a time long enough to cause reaction between the reactable constituents of the mixture to form a chemically stabilized mass.

9. The process of making a refractory body which comprises heat treating crude chrome ore to a temperature of at least 3100° F. until the chromite of the ore has recrystallized and the gangue material of the ore is distributed as a thin glass over and around the recrystallized grains of chromite, grinding the recrystallized ore, mixing together such ground and sized material and a calculated amount of finely ground magnesia yielding material, heat treating the mixture in an oxidizing atmosphere at a temperature of at least 3100° F. until the reactable constituents have reacted, the available magnesia being calculated to give as an end product of these reactions an iron free recrystallized chromite spinel in a ground mass of magnesium orthosilicate with magnesio-ferrite, periclase and monticellite dispersed therein.

10. The process according to claim 9 with the addition that the ground recrystallized ore is prior to mixing sized so that it passes a 6 mesh screen with substantially all retained on a 40 mesh screen.

GILBERT E. SEIL.